US006799787B2

(12) United States Patent
Angelos

(10) Patent No.: US 6,799,787 B2
(45) Date of Patent: Oct. 5, 2004

(54) TRANSFORMABLE TRUCK BED COVER

(76) Inventor: Mark M. Angelos, 8607 Chelsea Bridge Way, Timonium, MD (US) 21093

( * ) Notice: Subject to any disclaimer, the term of this patent is extended or adjusted under 35 U.S.C. 154(b) by 0 days.

(21) Appl. No.: 10/671,991

(22) Filed: Sep. 26, 2003

(65) Prior Publication Data
US 2004/0061351 A1 Apr. 1, 2004

Related U.S. Application Data

(60) Provisional application No. 60/414,825, filed on Sep. 27, 2002.

(51) Int. Cl.[7] .................................................. B60P 7/04
(52) U.S. Cl. .............................. 296/100.12; 296/100.18
(58) Field of Search ...................... 296/100.12, 100.11, 296/100.17, 100.18, 26.14, 26.15

(56) References Cited

U.S. PATENT DOCUMENTS

| | | | | | |
|---|---|---|---|---|---|
| 4,607,876 | A | * | 8/1986 | Reed | 296/100.18 |
| 4,964,669 | A | * | 10/1990 | Geier | 296/108 |
| 5,005,896 | A | * | 4/1991 | Li | 296/100.18 |
| 5,951,092 | A | * | 9/1999 | Cissell | 296/100.12 |
| 6,149,217 | A | * | 11/2000 | Plamondon | 296/10 |
| 6,152,517 | A | * | 11/2000 | Steadman | 296/107.01 |
| 6,224,140 | B1 | * | 5/2001 | Hoplock | 296/100.17 |
| 6,431,634 | B1 | * | 8/2002 | Ananian | 296/100.12 |
| 6,471,282 | B2 | * | 10/2002 | Hanning | 296/100.12 |

FOREIGN PATENT DOCUMENTS

JP             57-182537          * 11/1982

* cited by examiner

Primary Examiner—Joseph D. Pape
(74) Attorney, Agent, or Firm—Law Offices of Royal W. Craig

(57) ABSTRACT

A transformable truck bed cover that mounts on a pickup truck having an open bed. The cover assembly is transformable in height between a tonneau cover-like configuration and a fully elevated truck cap-like configuration. The cover assembly is also transformable in length between a fully retracted position extending over the open bed only a few inches behind the truck's cab to a fully extended position covering the entire length of the bed. The cover assembly generally comprises two anchoring rails fixedly attached to the sides of the truck bed, and two or more articulated cover support assemblies, extending across the bed, with an attached flexible cover assembly. The support assemblies are pivotally secured to the anchoring rails such that they may be pivoted upward to form a cap-shaped covering. The cover support assemblies are also slidably attached to the anchoring rails such that the flexible cover may be extended or retracted, in an accordion-like fashion, along the truck bed's length. Transformation between any of the various height or length configurations may be accomplished manually or automatically.

20 Claims, 10 Drawing Sheets

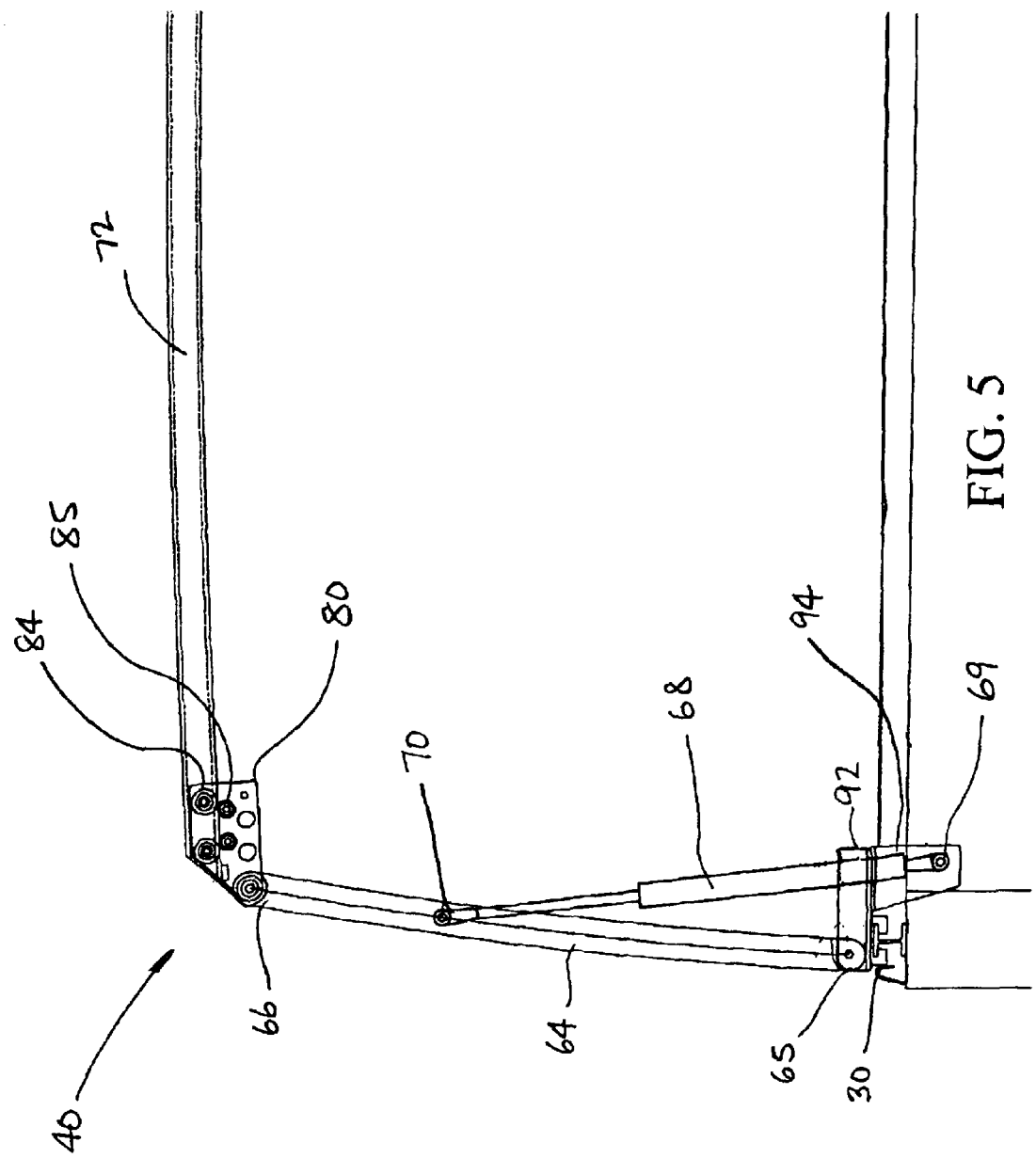

TRANSFORMABLE TRUCK BED COVER

CROSS-REFERENCE TO RELATED APPLICATION(S)

The present application derives priority from U.S. Provisional Patent Application No. 60/414,825, filed Sep. 27, 2002.

BACKGROUND OF THE INVENTION

1. Field of the Invention

The present invention relates to truck accessories and, more particularly, bed covers for pickup trucks and, even more particularly, to a truck bed cover assembly whose configuration may be transformed horizontally and vertically.

2. Description of the Background

Small trucks (i.e. pickup trucks) are among today's most popular and oft-purchased vehicles. A great deal of their popularity stems from a truck's ability to simultaneously transport one or more persons (i.e. the driver and one or more passengers) in the enclosed cab, plus bulky cargo in the exposed, or external, bed. The cargo can be of the type that would not be suitable for the trunk of a standard automobile due to any one of a variety of physical characteristics such as size, weight, and content (e.g. dirt, sand). However, this versatility comes with a price—the external bed exposes any cargo contained therein to the surrounding environment. The external, exposed bed compromises the ability of the truck in transporting certain forms of cargo (e.g. metallic tools subject to oxidation/rusting, electrically-operated devices that should not be allowed to get wet, materials that dissolve in water) during inclement weather. Moreover, items carried in the external bed are visible to individuals passing by a parked truck and are, therefore, tempting targets for theft.

Efforts to address these and other deficiencies inherent in the design of a small truck have resulted in a wide variety of bed covers. Many covers are designed for installation in only a single configuration (e.g. a typical tonneau cover, a rigid truck bed cap). Single configuration covers possess a variety of shortcomings. For example, due to its installation at the top edge of the truck's bed, a tonneau cover severely limits the maximum size of objects that may be carried by the small truck.

While covers of this type serve a purpose, they do not possess the versatility of covers that may be transformed among two or more configurations. The present inventor is not the first to address the need for a truck bed cover that is transformable among two or more utilitarian configurations. Examples of transformable truck bed covers may be found in U.S. Pat. No. 4,607,876 to Reed, U.S. Pat. No. 4,964,669 to Geier, U.S. Pat. No. 5,005,896 to Li, U.S. Pat. No. 6,152,517 to Steadman, and U.S. Pat. No. 6,224,140 to Hoplock.

U.S. Pat. No. 4,607,876 to Reed discloses a cover for the bed of a pickup truck that can be utilized in either a tensioned configuration attached to the upper edges of the walls of the bed to span the floor, or a collapsible tent configuration erected in the truck bed. The cover includes a number of components including an articulated support frame adapted to be assembled to enclose and define a chamber and to be disassembled for compact storage and several sheets of pliable material.

U.S. Pat. No. 4,964,669 to Geier discloses a foldable cover for a truck bed that includes a bed rail with support hinges for a foldable support frame.

U.S. Pat. No. 5,005,896 to Li discloses a retractable truck canopy frame incorporating two rails fixed at the sides of a truck bed, several sliding elements connected to the rails, several main frames each connected with one of the sliding elements, and several linking rods connecting the main frames along the two sides of the bed. By pushing or pulling the main frames along the rails, the truck canopy may be either retracted or extended as desired.

U.S. Pat. No. 6,152,517 to Steadman discloses a cover assembly for a pickup truck comprising a frame and spring urging arrangements extending downwardly from the sides of the frame to each side of the vehicle. A flexible cover extends over the frame and spring arrangements. The cover member is selectively rollable onto or off rollers such that the height of the assembly automatically raises or lowers as a result of the amount of cover member unrolled and by virtue of the spring urging arrangements maintaining the cover member taut.

U.S. Pat. No. 6,224,140 to Hoplock discloses a tonneau cover comprising a pair of panels which are pivotally mounted on respective sides of a truck bed. The panels extend laterally inward such that free ends of the panels engage each other in a closed position. The panels may be pivoted upward and secured in an upward orientation by a pair of rails connected between the free ends of the respective panels. In the upward position, the panels form a pair of side walls for supporting large cargo in the bed and the rails form a rack for supporting additional cargo thereon.

Unfortunately, each of the above-described, prior art devices lacks total versatility because they do not allowing the configuration of the cover to be adjusted along both a vertical axis (i.e. adjustable in height relative to the surface of the truck bed) and a horizontal axis (i.e. adjustable along the length of the truck bed). The Reed, Steadman, and Hoplock apparatus possess only height adjustment capabilities, while just the length of the Geier and Li devices may be adjusted. Therefore, there remains a need for a transformable truck bed cover whose dimensions are adjustable along multiple axes. Thereby providing a substantial degree of utility in transporting and protecting cargo of varying size, weight, and content. An apparatus of this type should be easily transformed from one configuration to another, fabricated of strong, lightweight materials for optimum durability/longevity, and economical to manufacture to provide for widespread use.

SUMMARY OF THE INVENTION

It is, therefore, the primary object of the present invention to provide an improved transformable truck bed cover that may be adjusted in height along a vertical axis and/or in length along a horizontal axis.

It is another object of the present invention to provide an improved transformable truck bed cover that may be easily transformed from one configuration to another.

It is still another object of the present invention to provide an improved transformable truck bed cover that may be transformed from one configuration to another by either manual or automated means.

It is another object of the present invention to provide an improved transformable truck bed cover that may be provided in either a fixedly attached or detachably attached configuration.

Yet another object of the present invention is to provide an improved transformable truck bed cover that is fabricated of strong, lightweight materials for optimum durability/longevity.

Still another object of the present invention is to provide an improved transformable truck bed cover that is aesthetically pleasing and economical to manufacture.

These and other objects are accomplished by a transformable truck bed cover that mounts on a pickup truck having an open bed. The cover assembly is transformable in height between a tonneau cover-like configuration and a fully elevated truck cap-like configuration, at one or more intermediate positions. At any height, the transformable cover assembly may completely cover the truck bed to secure and protect the cargo contained therein. The cover assembly is also transformable in length along a continuum or at one or more intermediate positions between a fully retracted position extending over the open bed only a few inches behind the truck's cab to a fully extended position covering the entire length of the bed.

This flexibility in configuring the transformable cover provides for a myriad of uses not possible with either a traditional tonneau cover or a rigid truck cap. An example would be the placing of the present invention in the fully retracted position to dump a volume of dirt or gravel into a truck bed and then extending the cover to protect the cargo from the elements (e.g. a rain storm turning the load of dirt into a muddy quagmire). The transformability of the present invention allows it to be fully elevated and extended to maximize the size of objects that may be carried and protected in a truck's bed, or to be lowered, while extended, to provide a small truck with clean, aesthetically-pleasing lines or to assist in maximizing the vehicle's fuel economy (i.e. to eliminate the drag caused by air circulating in the truck's bed).

The present invention generally comprises two anchoring rails fixedly attached to the sides of the truck bed, two cross members typically connecting the ends of the anchoring rails at the front and back ends of the bed, and two or more articulated cover support assemblies, extending across the bed, with an attached flexible cover assembly. The cross member located at the front end of the bed is fixedly attached to the bed and the ends of the anchoring rails. The cross member located at the back end of the bed is detachably attached to the ends of the anchoring rails. The cover support assemblies are stored in a substantially flat, or collapsed, position when the present invention is in an essentially tonneau configuration. The support assemblies are pivotally secured to the anchoring rails such that they may be pivoted upward to form a cap-shaped covering. The height of the fully elevated cover assembly may match that of the truck cab, or it may reach a height greater than that of the truck cab. The cover support assemblies are also slidably attached to the anchoring rails such that the flexible cover assembly may be extended or retracted, in an accordion-like fashion, along the truck bed's length. Transformation between any of the various height or length configurations may be accomplished by manual or automated means. The support assemblies may also be provided with brackets for the transportation of items such as ladders external to the cover assembly.

The transformable truck bed cover of the present invention is fabricated of a variety of strong, lightweight materials to provide the durability/longevity and configurability required by the nature of its usage. The present invention's design is simple and straightforward, and can be economically manufactured.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 5 is a side perspective view of a cover support assembly 40 shown in the fully elevated position.

DETAILED DESCRIPTION OF THE PREFERRED EMBODIMENTS

Figure 1:
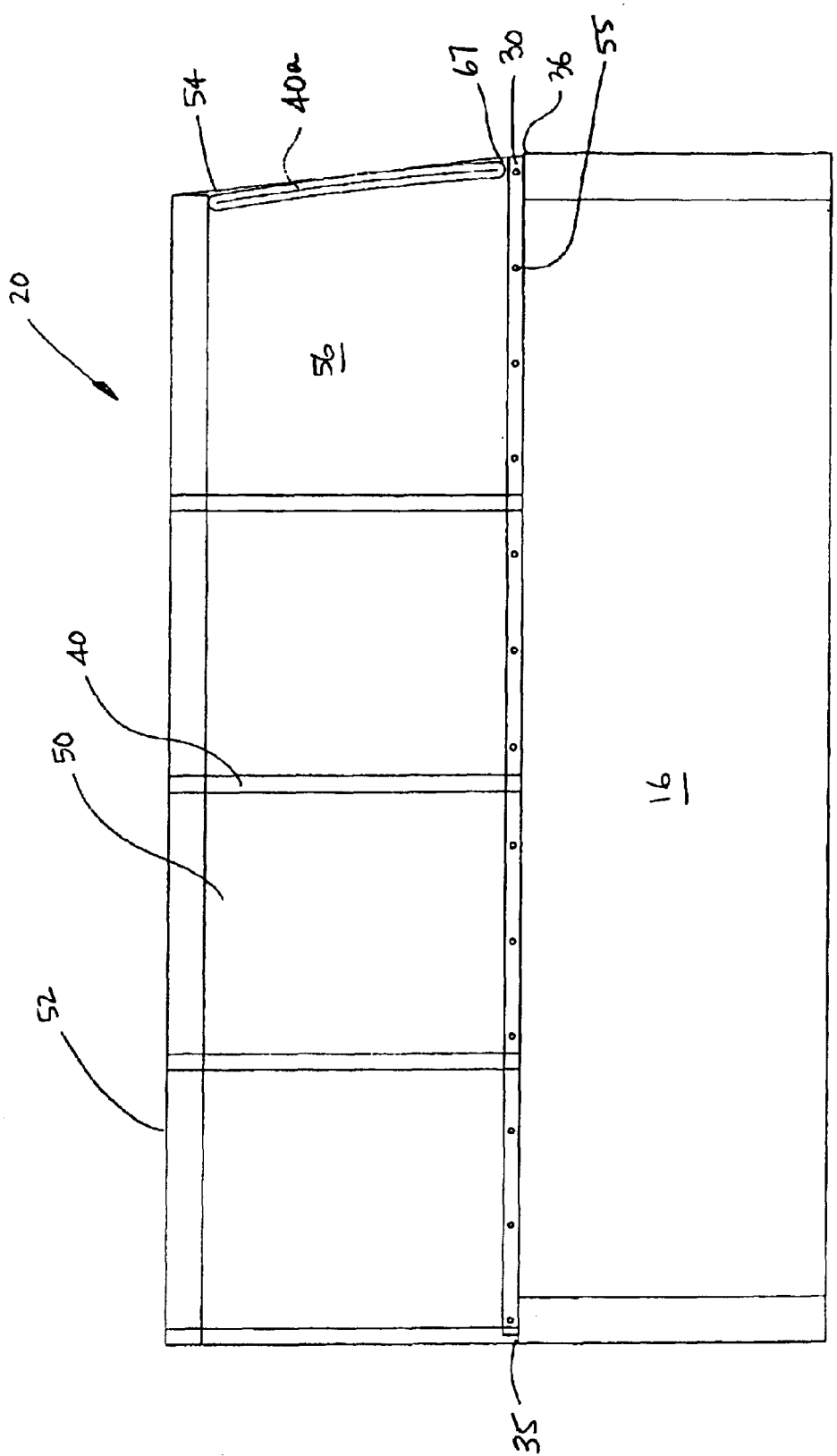
FIG. 1 is a side perspective view of a transformable truck bed cover 20, according to a first embodiment of the present invention, shown in the fully elevated and extended position.
Figure 2:
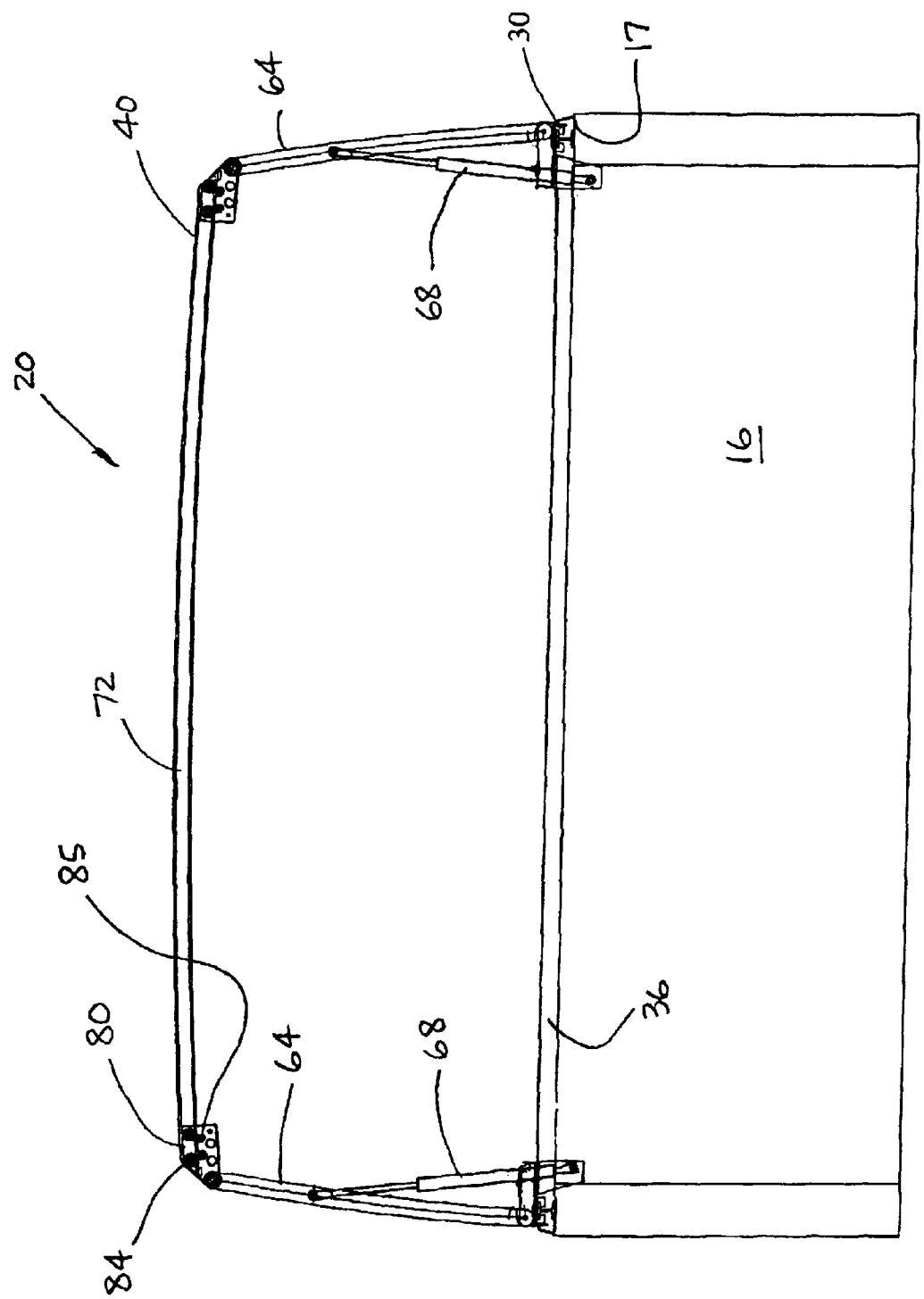
FIG. 2 is an end perspective view of the transformable truck bed cover 20 as in FIG. 1.
Figure 3:
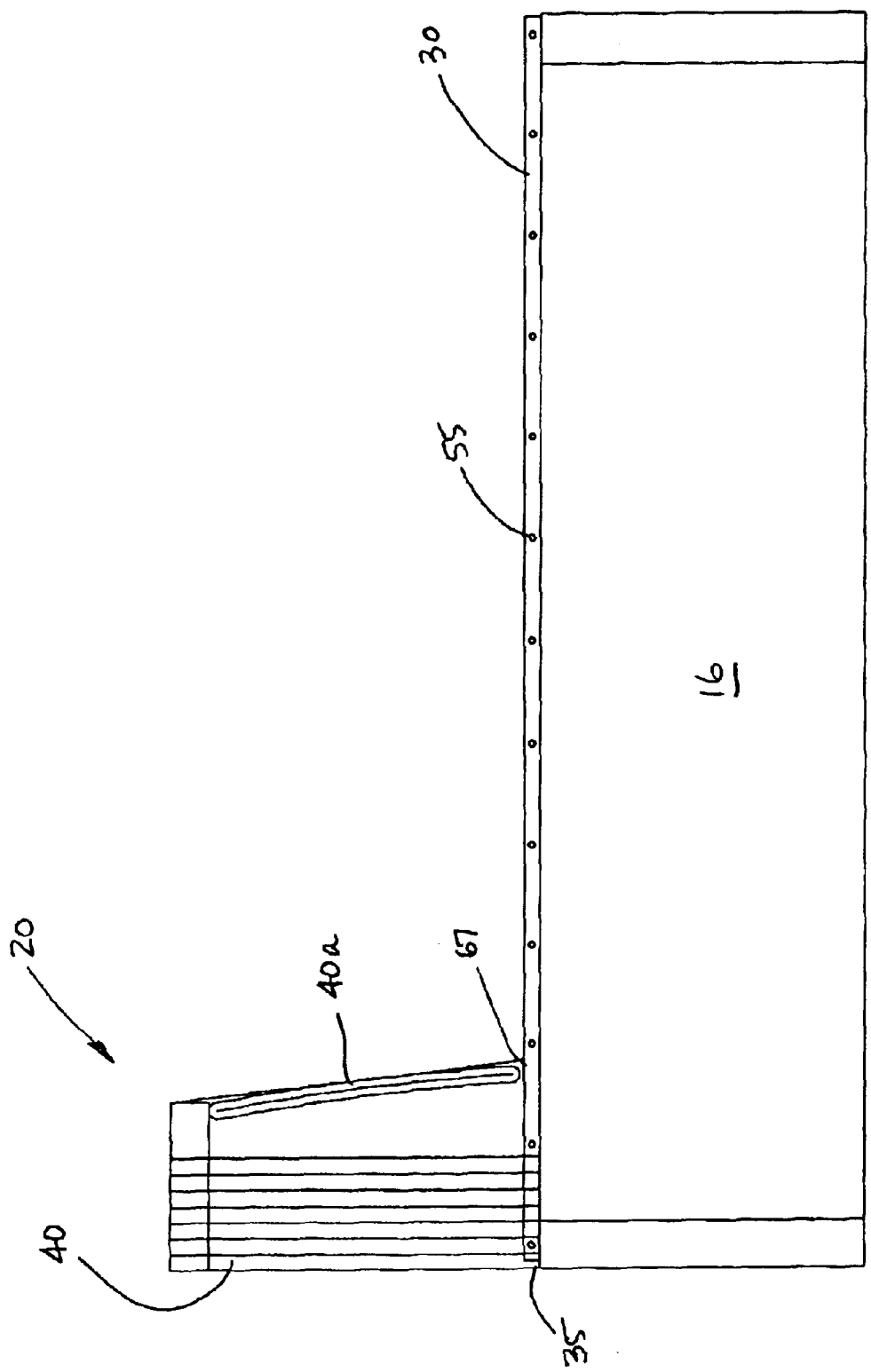
FIG. 3 is a side perspective view of a transformable truck bed cover 20 shown in the fully elevated and retracted position.
Figure 4:
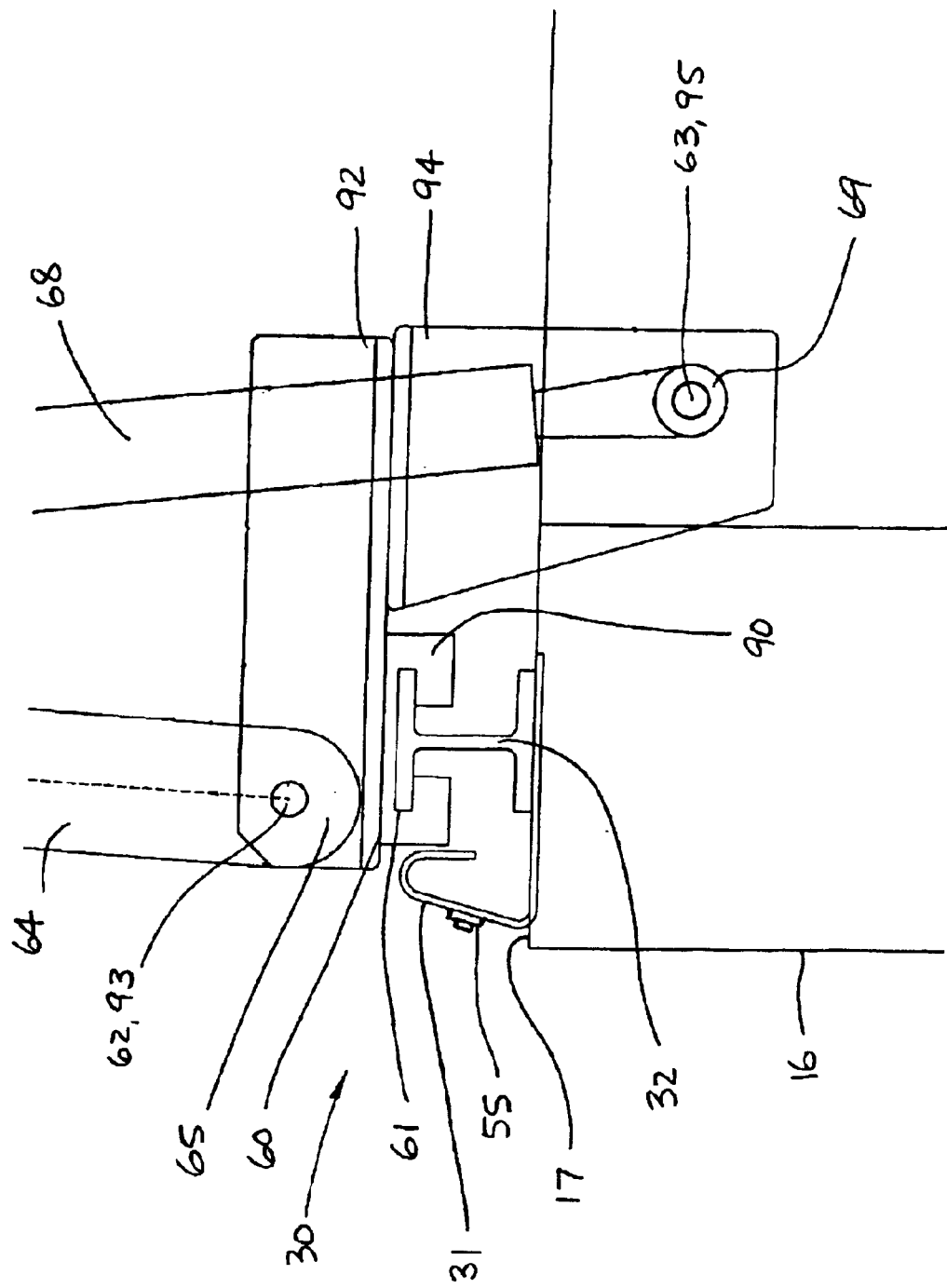
FIG. 4 is a cross-sectional view of an anchoring rail 30.

FIGS. 1 and 2 are, respectively, side and end perspective views of a transformable truck bed cover 20, according to a first embodiment of the present invention, shown in the fully elevated and extended position. FIG. 3 is a side perspective view of a transformable truck bed cover 20 shown in the fully elevated and retracted position, and FIG. 4 is a cross-sectional view of an anchoring rail 30. The first embodiment of the present invention generally comprises two anchoring rails 30, two cross members 35, 36 typically connecting the ends of the anchoring rails 30 at the front and back ends of the bed 16 of a pickup truck, a plurality of cover support assemblies 40, and a flexible cover assembly 50.

Each anchoring rail 30 is fixedly attached to a top surface 17 of a side of the bed 16 of a pickup truck. Cross members 35, 36 are typically attached at the ends of the two anchoring rails 30. Cross member 35 is located at the front end of the bed 16 and may be fixedly attached to the bed 16 and the ends of the anchoring rails 30. Cross member 36 is located at the back end of the bed 16 and may be detachably attached to the ends of the anchoring rails 30. The cross members 35, 36 increase the structural integrity of the transformable cover 20 when attached, and cross member 36 may be temporarily removed to facilitate the loading/unloading of the truck bed 16. Each rail 30 and cross member 35, 36 is preferably a length of commercially available aluminum. Each rail 30 may be a commercially available extrusion possessing the I-shaped cross-section 32 shown in FIG. 4. Other materials and extruded cross-sections may also be utilized. The top of the "I" and the slot 61 formed in the anchor sled 60 provide for the sliding interaction between the anchoring rails 30 and the cover support assemblies 40 described in detail below.

Figure 11:
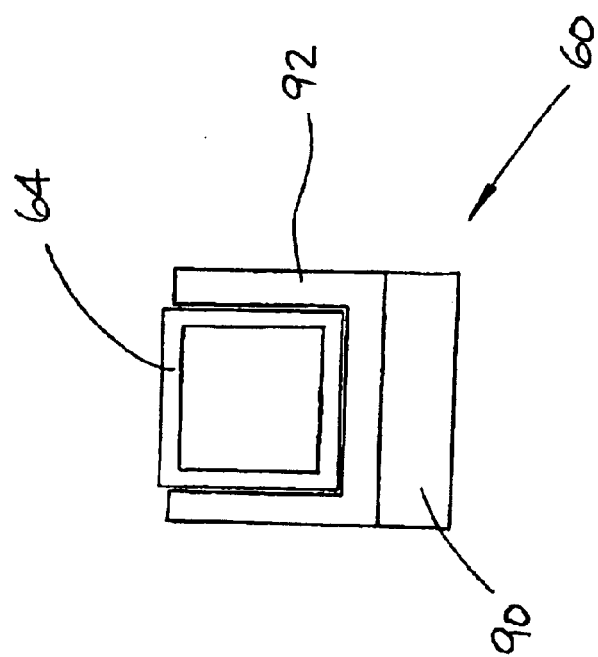
FIG. 11 is an end perspective view of a side member 64 and the top section of an anchor sled 60

Each of the plurality of cover support assemblies 40 preferably includes two anchor sled assemblies 60, two side members 64 preferably fabricated from material possessing a square tubular cross-section (see FIG. 11), two commercially available, lockable, pneumatic support cylinders 68, a cross member 72 preferably fabricated from material possessing an I-shaped cross-section (see FIG. 6), and a side member/cross member interface assembly 80. The side members 64 may include support bracketry (not shown in the Figures) for the transportation of, for example, one or more ladders external to the cover assembly 20 when it is in the fully elevated and extended position of FIGS. 1 and 2.

FIG. 5 is a side perspective view of a cover support assembly 40 shown in the fully elevated position, and also represents a wider view of that shown in FIG. 4. With reference to FIGS. 4 and 5, each anchor sled assembly 60 comprises a base 90, a side member connector 92, and a support cylinder connector 94. The side member connector 92 is fixedly attached to the base 90. The support cylinder connector 94 is fixedly attached to the side member connector 92. In other embodiments of the present invention, the base 90, side member connector 92, and support cylinder connector 94 may be a single, unitized component. A slot 61 formed in the base 90 engages the top of the I-shaped cross-section 32 of an anchor rail 30 to provide the sliding connection between a cover support assembly 40 and a rail 30. Through holes 62 located in the connector 92 provide a pivoting connection via pin 93 with an end 65 of a side member 64. Through holes 63 located in the connector 94 provide a pivoting connection via pin 95 with an end 69 of a support cylinder 68. The other end 70 of the support cylinder 68 is pivotally attached to the side member 64 at a point that is approximately two-thirds of the distance from the end 65 that is pivotally connected to the anchor sled 60 to its other end 66.

Figure 6:
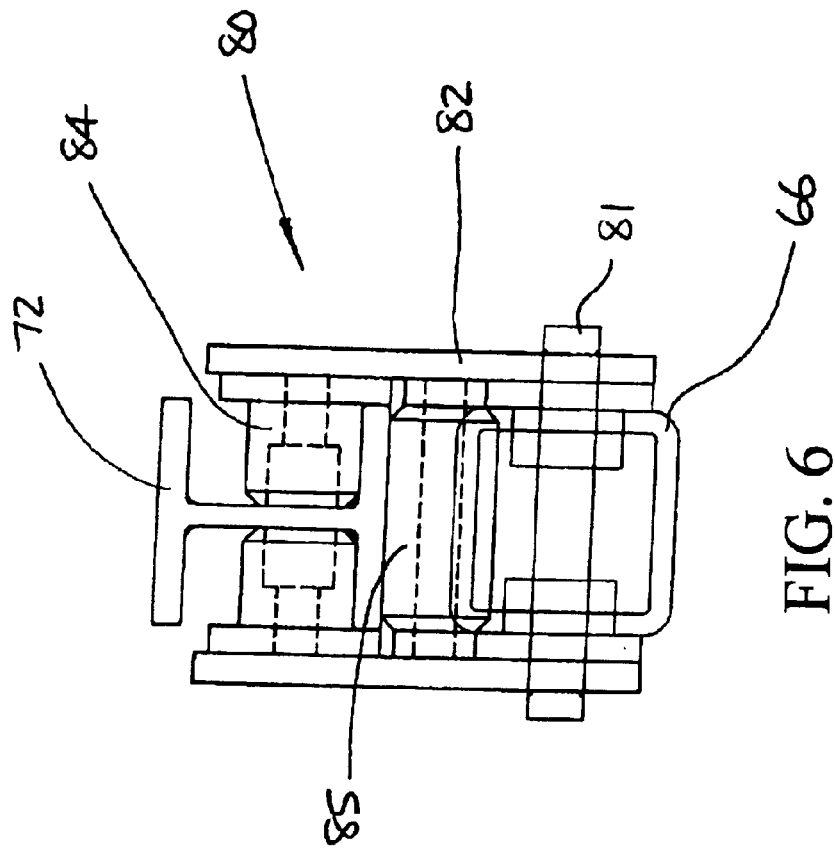
FIG. 6 is an end perspective view of a side member/cross member interface 80.

As shown in FIG. 6's end perspective view of a side member/cross member interface 80, the other end 66 of the side member 64 is pivotally attached to an interface assembly 80 via a pivot pin 81. Each interface assembly 80 comprises two side plates 82, four commercially available rollers 84 each rotatably attached to one of the plates 82, and two commercially available rollers 85 rotatably attached between the two plates 82. In other embodiments of the present invention, the interface assembly 80 may include a custom-designed slide assembly in place of, among others, the commercially available rollers 84, 85.

The plurality of rollers 84, 85 rotatably mounted within the interface 80 rotatably engage the cross member 72. The rollers 84 engage the cross member 72 along the inside, bottom surfaces of its I-shaped cross-section while the rollers 85 engage the external bottom surface of the "I". This combination of pivoting and sliding connections allows the interface 80 to move toward the end of the cross member 72 as the side member 64 is pivoted upward (i.e. the cover assembly 20 is elevated), or to move toward the center of the cross member 72 as the side member 64 is pivoted downward (i.e. the cover assembly 20 is in the collapsed configuration of FIGS. 7–10). In this manner, the cross member 72, which defines the top surface of the cover assembly 20, always remains parallel to the floor of the bed 16 of the truck.

The side members 64, cross member 72, side plates 82, base 90, side member connector 92, and support cylinder connector 94 are each preferably fabricated from a strong, lightweight, commercially available material such as aluminum.

As indicated in FIG. 1, the flexible cover assembly 50 comprises a top cover 52, two end covers 54, and two side covers 56. The covers 52, 54, 56 are preferably fabricated of a commercially available, pliable material (e.g. vinyl, nylon, marine-grade SUNBRELLA® cloth) possessing a limited amount of elasticity and appropriate thermal characteristics. The components comprising the cover assembly 50 may be fixedly or removably attached to the components comprising the plurality of support assemblies 40 (see the detailed discussion below). In other embodiments of the present invention, the flexible cover assembly 50 may incorporate one or more plastic windows to provide visual access to the interior of the transformable cover 20.

When the transformable cover 20 is in the fully collapsed position of FIGS. 7–10, regardless of its degree of extension/retraction, the top cover 52 may be fixedly/removably attached to the cross members 72, and to the cover attachment rails 31 and cross members 35, 36 via a plurality of snap-type closures 55 (see FIG. 4). Each of the two end covers 54 may be fixedly/removably attached at the top to a cross member 72, at the bottom to cross member 35 or 36, and at the sides to two side members 64. Each of the two side covers 56 may be fixedly/removably attached to a plurality of side members 64. With the cover 20 in the fully collapsed position, the end covers 54 may occupy a folded position proximate the cross members 35, 36, 72 and the snap-closed top cover 52 while the two side covers 56 may occupy a folded position between the cover attachment rail 31, the side members 64, the cross members 72, and the snap-closed top cover 52.

When the transformable cover 20 is in the fully elevated position, regardless of its degree of extension/retraction, the top cover 52 may be fixedly/removably attached to the cross members 72, and to the end and side covers 54, 56, respectively, via a plurality of snap-type closures 55. The end covers 54 and the side covers 56 remain fixedly/removably attached as described above (i.e. transformable cover 20 in the fully collapsed position).

The degree of extension/retraction of the cover assembly 20 is adjusted, for example between the fully extended position of FIG. 1 and the fully retracted position of FIG. 3, by disengaging the locking mechanisms 67 located in each of the two anchor sled assemblies 60 attached to the rearmost cover support assembly 40a (see FIG. 1). Once both of the mechanisms 67 are unlocked, the cover assembly 20 may be extended/retracted by pulling/pushing cover support assembly 40a, causing its anchor sled assembly 60 to slide along the anchoring rail 30. The top and side covers 52, 56, respectively, fold/unfold between side members 64 and cross members 72 as the transformable cover 20 is retracted/extended.

Figure 7:
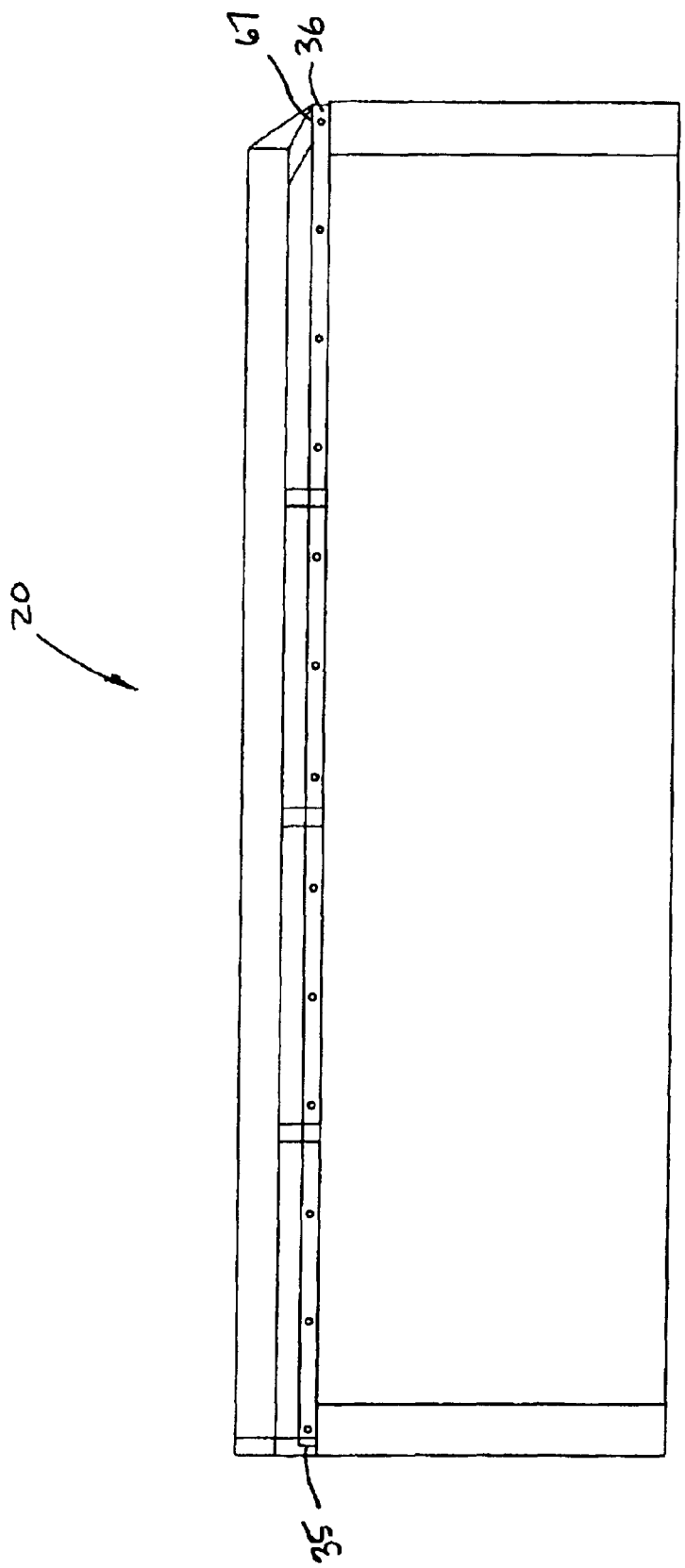
FIG. 7 is a side perspective view of a transformable truck bed cover 20, according to a first embodiment of the present invention, shown in the fully collapsed and extended position.
Figure 8:
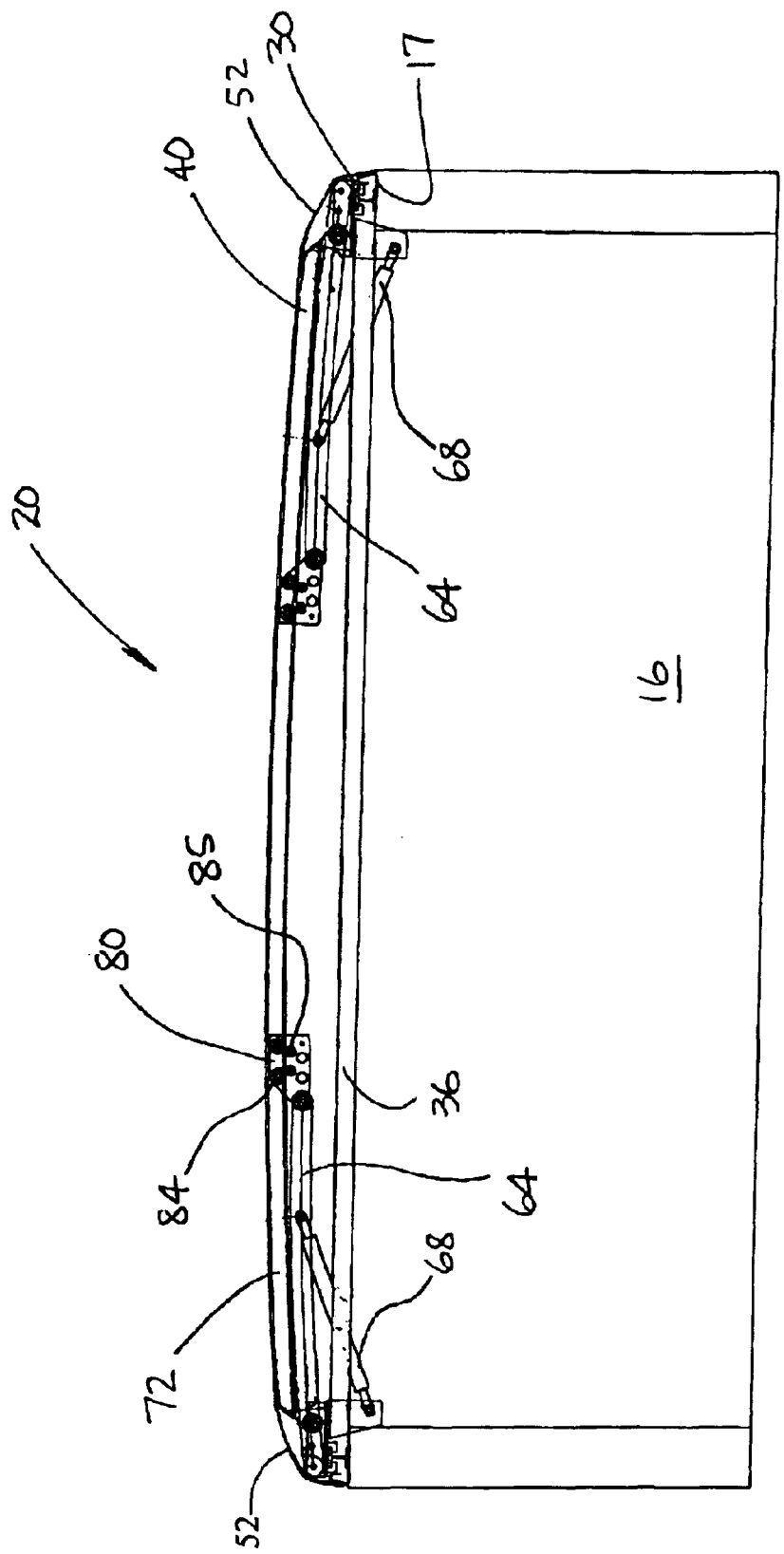
FIG. 8 is an end perspective view of the transformable truck bed cover 20 as in FIG. 7.
Figure 9:
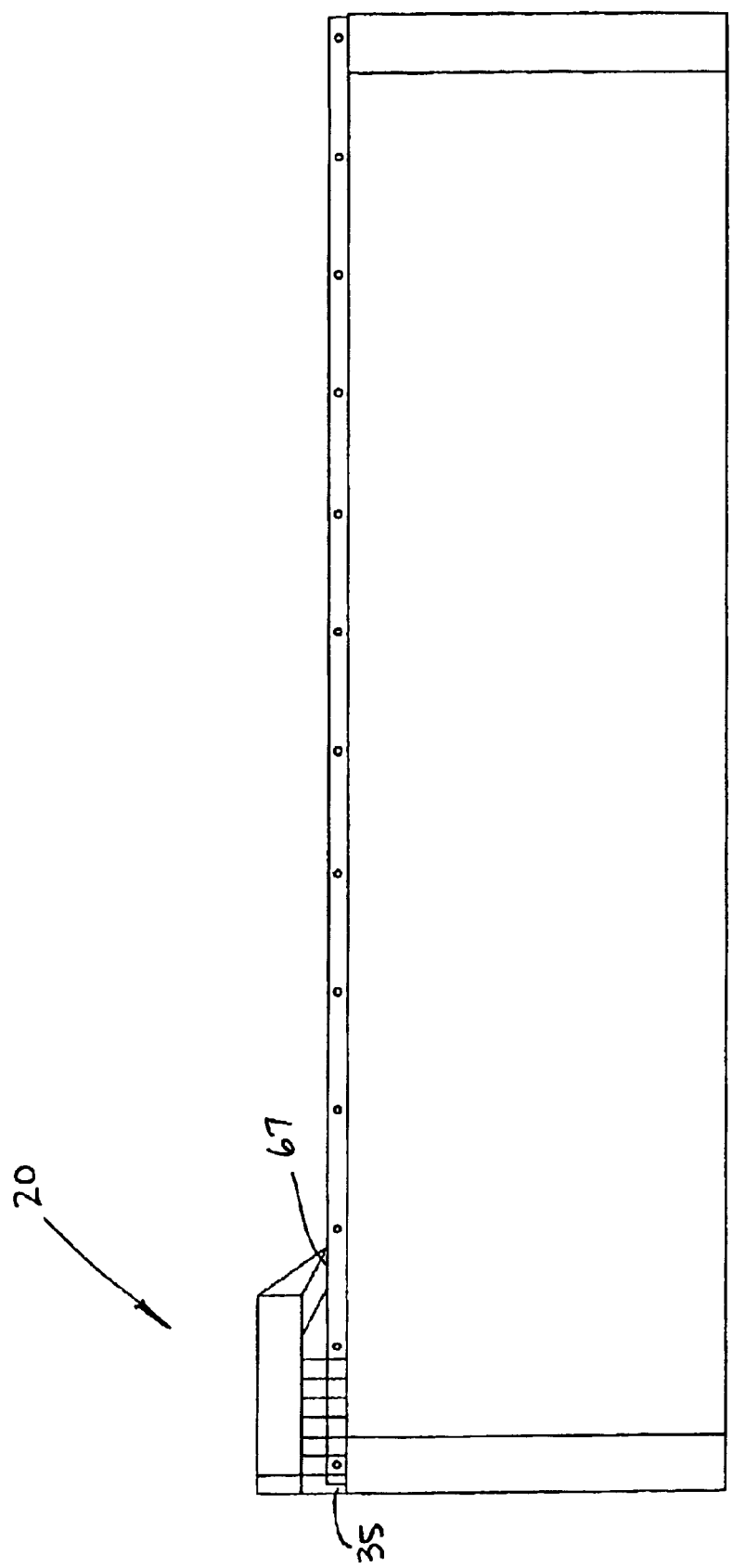
FIG. 9 is a side perspective view of a transformable truck bed cover 20 shown in the fully collapsed and retracted position.

When the desired degree of extension/retraction is achieved, as seen in FIG. 7, the locking mechanisms 67 are engaged to maintain the rearmost cover support assembly 40a in its new position. The remaining cover support assemblies 40 are not typically equipped with locking mechanisms and, therefore, may slide freely along the anchoring rail 30, in an accordion-like fashion, in response to the movement of cover support assembly 40a (i.e. during extension each cover support assembly 40 moves once the section of flexible side cover 56 extending between it and the next rearward assembly 40 is pulled taut, or during retraction each cover support assembly 40 moves in response to contact from the next rearward assembly 40).

Figure 10:
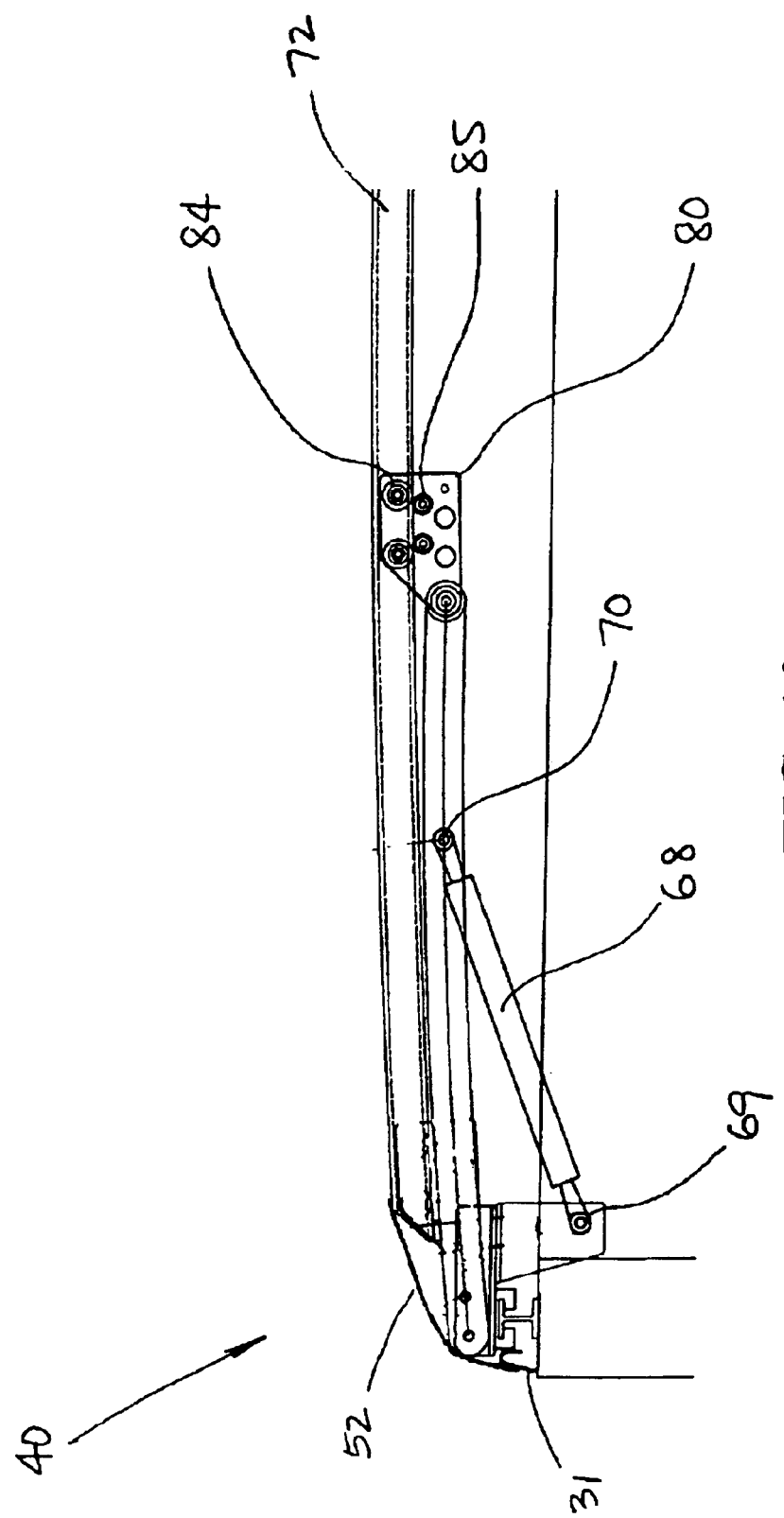
FIG. 10 is a side perspective view of a cover support assembly 40 shown in the fully collapsed position.

FIGS. 5 and 10 show a cover support assembly 40 in the fully elevated and fully collapsed positions, respectively. Due to the use of a plurality of identical cover support assemblies 40 positioned in parallel along its length, FIGS.

5 and 10 may also be utilized to depict the overall transformable cover assembly 20 in the fully elevated and fully collapsed configurations. The height of the cover assembly 20 is adjusted, for example between the fully elevated position of FIG. 5 and the fully collapsed position of FIG. 10, by disengaging the snap closures 55 utilized to attach the top cover 52 to the end and side covers 54,56, respectively, and exerting downward force on one or more cross members 72 in order to collapse the support cylinders 68. Once the cover support assemblies 40 and cylinders 68 have reached the fully collapsed position of FIG. 10, the top cover may be attached to the snap closures 55 mounted on the cover attachment rail 31. Affixing the top cover 56 to the attachment rail 31 in this manner serves to hold/maintain the cover assembly 20 in the fully collapsed position.

To return the cover assembly 20 to the fully elevated configuration of FIG. 5, the top cover 52 may be detached from the cover attachment rail 31 by opening the snap closures 55. The removal of the hold-down force supplied by the snap closures 55 allows the support cylinders 68 to fully extend, thereby raising cover assembly 20 to its fully elevated position. The top cover 52 may then be affixed to the end and side covers 54,56, respectively via the series of snap closures 55.

As is readily perceived in the foregoing description, the present invention's design is simple and straightforward, and can be economically manufactured. Its flexibility allows for a myriad of uses in the transportation and protection of cargo held in the bed of a pickup truck.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A transformable truck bed cover for mounting over an open bed of a truck, comprising:
   means for detachably attaching said truck bed cover to said open bed;
   means for adjusting the height of said truck bed cover;
   means for adjusting the length of said truck bed cover; and
   a cover assembly detachably attached to said means for detachably attaching said truck bed cover to said open bed and said means for adjusting the height and the length of said truck bed cover;
   wherein said truck bed cover is utilized to secure any items placed in said open bed by virtue of being variable in height between a fully collapsed position and a fully elevated position and, simultaneously, being variable in length between a fully retracted position, a continuum of partially extended positions, and a fully extended position.

2. The transformable truck bed cover according to claim 1, wherein said means for detachably attaching said truck bed cover to said open bed comprise two anchor rails and two cover attachment rails.

3. The transformable truck bed cover according to claim 2, wherein said means for adjusting the height and the length of said truck bed cover comprise a plurality of support assemblies pivotally and slidably engaged with said anchor rails.

4. The transformable truck bed cover according to claim 3, further comprising a first cross member fixedly attached at first ends of said two anchor rails and a second cross member detachably attached at second ends of said two anchor rails.

5. The transformable truck bed cover according to claim 3, wherein each of said plurality of support assemblies comprises;
   two sled assemblies;
   two side members, each of said two side members being pivotally engaged at a first end with one of said two sled assemblies;
   two support cylinders, each of said two support cylinders being pivotally engaged at a first end with one of said two sled assemblies and at a second end with one of said two side members; and
   a third cross member, said third cross member being slidably engaged at each end with second ends of said two side members.

6. The transformable truck bed cover according to claim 5, wherein each of said two sled assemblies of one of said plurality of support assemblies comprises a locking mechanism for releasably fixing the length of said truck bed cover at said fully retracted position, any one of said continuum of partially extended positions, or at said fully extended position.

7. The transformable truck bed cover according to claim 5, wherein each of said two sled assemblies comprises;
   a base defined by a slot, said slot being slidably engaged with one of said two anchor rails;
   a first connector fixedly attached to said base, said first connector being pivotally engaged with said first end of one of said two side members; and
   a second connector fixedly attached to said first connector, said second connector being pivotally engaged with said first end of one of said two support cylinders.

8. The transformable truck bed cover according to claim 5, wherein said third cross member is fabricated from a material possessing an I-shaped cross-section.

9. The transformable truck bed cover according to claim 8, further comprising two interface assemblies for facilitating said slidable engagement between said third cross member and said two side members.

10. The transformable truck bed cover according to claim 9, wherein each of said two interface assemblies comprises;
    first and second side plates pivotally engaged with said second end of one of said two side members;
    two first rollers, each of said two first rollers being rotatably attached between said first side plate and said second side plate; and
    four second rollers, two of said four second rollers being rotatably attached to said first side plate and two of said four second rollers being rotatably attached to said second side plate;
    wherein said two first rollers rotatably engage a bottom, external surface of said I-shaped cross-section of said third cross member and said four second rollers rotatably engage bottom, internal surfaces of said I-shaped cross-section of said third cross member 11. The transformable truck bed cover according to claim 4, wherein said cover assembly comprises a flexible top cover, two flexible side covers, a first flexible end cover, and a second flexible end cover.

12. The transformable truck bed cover according to claim 11, wherein said flexible top cover may be detachably attached to said cover attachment rails, said plurality of support assemblies, said first cross member, and said second cross member when said truck bed cover is in said fully collapsed position, and said flexible top cover may be detachably attached to said plurality of support assemblies, said two flexible side covers, and said first and second flexible end covers when said truck bed cover is in said fully elevated position.

13. The transformable truck bed cover according to claim 11, wherein said two flexible side covers may be detachably attached to said plurality of support assemblies when said truck bed cover is in any position.

14. The transformable truck bed cover according to claim 11, wherein said first flexible end cover may be detachably attached to one of said plurality of support assemblies and said first cross member when said truck bed cover is many position.

15. The transformable truck bed cover according to claim 11, wherein said second flexible end cover may be detachably attached to one of said plurality of support assemblies and said second cross member when said truck bed cover is in a fully extended position, and said second end cover may be detachably attached to one of said plurality of support assemblies when said truck bed cover is in any one of said continuum of partially extended positions or said frilly retracted position.

16. The transformable truck bed cover according to claim 1, wherein height adjustment between said frilly collapsed position and said fully elevated position is performed manually.

17. The transformable truck bed cover according to claim 1, wherein height adjustment between said fully collapsed position and said fully elevated position is accomplished automatically.

18. The transformable truck bed cover according to claim 1, wherein length adjustment between any two positions is performed manually.

19. The transformable truck bed cover according to claim 1, wherein length adjustment between any two positions is accomplished automatically.

20. A transformable truck bed cover for mounting over an open bed of a truck, comprising;
  two anchor rails;
  two cover attachment rails;
  a plurality of support assemblies pivotally engaged with said anchor rails, each of said plurality of support assemblies comprises;
    two sled assemblies, each of said two sled assemblies comprises;
      a base;
      a first connector fixedly attached to said base, said first connector being pivotally engaged with said first end of one of said two side members; and
      a second connector fixedly attached to said first connector, said second connector being pivotally engaged with said first end of one of said two support cylinders;
    two side members, each of said two side members being pivotally engaged at a first end with one of said two sled assemblies;
    two support cylinders, each of said two support cylinders being pivotally engaged at a first end with one of said two sled assemblies and at a second end with one of said two side members; and
    a cross member, said third cross member being slidably engaged at each end with second ends of said two side members; and
  a flexible cover assembly, said flexible cover assembly comprises;
    two side covers, wherein said two side covers may be detachably attached to said plurality of support assemblies when said truck bed cover is in any position;
    two end covers, wherein each of said two end covers may be detachably attached to one of said plurality of support assemblies when said truck bed cover is in any position; and
    a top cover wherein said top cover may be detachably attached to said cover attachment rails and said plurality of support assemblies when said truck bed cover is in a fully collapsed position, and said top cover may be detachably attached to said plurality of support assemblies, said two side covers, and said two end covers when said truck bed cover is in a fully elevated position;
  wherein said truck bed cover is utilized to secure any items placed in said open bed by virtue of being variable in height, either manually or automatically adjusted, between a fully collapsed position and a fully elevated position.

* * * * *